United States Patent [19]

Italiano

[11] 4,380,772
[45] Apr. 19, 1983

[54] LOW INK INDICATION FOR INK JET PRINT HEAD

[75] Inventor: Victor J. Italiano, Ithaca, N.Y.

[73] Assignee: NCR Corporation, Dayton, Ohio

[21] Appl. No.: 334,106

[22] Filed: Dec. 24, 1981

[51] Int. Cl.³ .......................................... G01D 18/00
[52] U.S. Cl. .............................. 346/140 R; 101/364; 116/227; 118/713; 222/23; 239/74; 427/8
[58] Field of Search ............ 346/140 R, 75; 116/227, 116/206; 73/290 R; 222/51, 23, 154, 158; 101/364; 427/8; 118/712, 713; 239/71, 74

[56] References Cited

U.S. PATENT DOCUMENTS 2,241,759 5/1941 Barnes .................................. 239/71
2,671,424 3/1954 Herring ........................... 116/227 X Primary Examiner—Joseph W. Hartary
Attorney, Agent, or Firm—J. T. Cavender; Wilbert Hawk, Jr.; George J. Muckenthaler

[57] ABSTRACT

A visual indication of low ink supply wherein a soluble-dye fluid is added to the ink supply and floats on the surface of the ink. The low ink supply is indicated by a change in color printed on the record media by reason of the indicating fluid having different characteristics from the printing ink.

16 Claims, 1 Drawing Figure

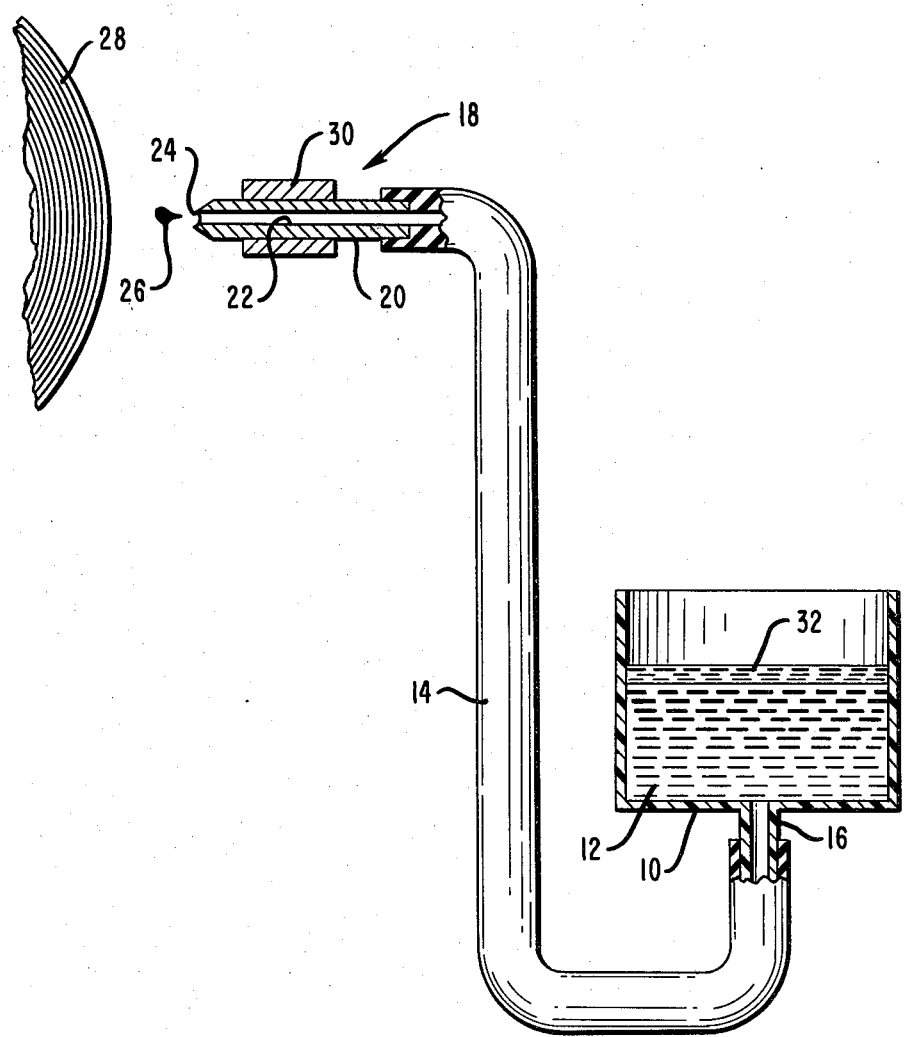

LOW INK INDICATION FOR INK JET PRINT HEAD

BACKGROUND OF THE INVENTION

In the field of non-impact printing, the most common types of printers have been the thermal printer and the ink jet printer. When the performance of a non-impact printer is compared with that of an impact printer, one of the problems of the non-impact machine has been the control of the printing operation. As is well-known, the impact operation depends upon the movement of impact members such as wires or the like, and which are typically moved by means of an electromechanical system which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing must deal with rapid starting and stopping movement of the ink fluid from a supply of the fluid. In each case of non-impact printing, the precise control of the thermal elements and of the ink droplets is necessary to provide for both correct and high-speed printing.

In the matter of ink jet printing, it is extremely important that the control of the ink droplets be precise and accurate from the time of formation of the droplets to depositing of such droplets on paper or like record media and to make certain that a clean printed character results from the ink droplets. While the method of printing with ink droplets may be performed either in a continuous manner or in a demand pulse manner, the latter type method and operation is disclosed and is preferred in the present application as applying the features of the present invention. The drive means for the ink droplets is generally in the form of a crystal or piezoelectric type element to provide the high-speed operation for ejecting the ink through the nozzle while allowing time between droplets for proper operation. The ink nozzle construction must be of a nature to permit fast and clean ejection of ink droplets from the print head.

Additionally, in an ink jet printer, it is considered a basic requirement to provide some type of low ink indication to signal the impending exhaustion of the ink supply. Contrasted with an impact printer wherein an examination of the printed output provides an indication of low ink by reason of the printed output becoming faint or difficult to read, the ink jet printer will cease operation when the ink supply is depleted.

The manner of sensing low ink can be performed electrically or optically and the low ink condition can be signalled to the operator. However, this manner of sensing is more expensive and may not be feasible in certain types of ink jet printer configurations.

Representative documentation in the field of ink jet printing and ink supply indication means includes U.S. Pat. No. 4,148,041, issued to G. Rosenstock on Apr. 3, 1979, which discloses the use of a flushing liquid or wetting agent which does not mix with the printing liquid in a manner and for the purpose of eliminating air bubbles from the printing operation. A preferred form of the flushing liquid is an isoparaffin.

U.S. Pat. No. 4,183,031, issued to E. L. Kyser et al. on Jan. 8, 1980, discloses an ink supply connection for automatically closing off the ink supply line and includes an ink supply pressure sensor for sensing changes in pressure in the system and a valve operated by the sensor to supply ink to the system upon reduction of the pressure below a predetermined level.

U.S. Pat. No. 4,196,625, issued to H. Kern on Apr. 8, 1980, discloses a device for monitoring the ink supply in ink recording devices wherein electrodes are wetted by the ink and a circuit detects the electrical resistance between the electrodes and triggers a display device when the amount of fluid falls below a specific volume.

U.S. Pat. No. 4,202,267, issued to J. Heinzl et al. on May 13, 1980, discloses a device for monitoring the ink supply in an ink printer wherein electrodes are wetted by the ink and a circuit monitors the electrical resistance which varies with the amount of ink in the reservoir. Additional circuit means may be connected to the monitoring means for actuating a warning device prior to triggering a display element indicating the exhaustion of the ink supply.

SUMMARY OF THE INVENTION

The present invention relates to ink jet printing, and more particularly to means for indicating a low supply of ink. The indicating means is in the form of a fluid having characteristics of lower density than ink, immiscible with respect to ink, and containing a soluble dye of different color from the ink. Since the indicating fluid is immiscible with respect to ink, the fluid is poured or otherwise placed in the ink reservoir and stays on the top surface of the ink in the manner where the fluid floats on such surface.

As the printing ink in the reservoir is depleted, the indicating fluid flows from the reservoir and through the supply line to the print head where the fluid is ejected from the nozzle during printing operation. Since the indicating fluid is of different color from the printing ink, the droplets of fluid on the record media provide a visual indication of a depleted supply of printing ink.

In view of the above discussion, the principal object of the present invention is to provide an indication of low supply of printing ink at a minimum cost.

Another object of the present invention is to provide a visual indication of low supply of printing ink.

An additional object of the present invention is to provide an indicating fluid different from but associated with printing ink for indicating low ink supply.

A further object of the present invention is to provide an indicating fluid that floats on the surface of the printing ink and has different characteristics therefrom to indicate low ink supply upon observation of droplets of the fluid on the record media.

Additional advantages and features of the present invention will become apparent and fully understood from a reading of the following description, together with the annexed drawing.

BRIEF DESCRIPTION OF THE DRAWING

The single FIGURE shows a diagrammatic view, partly in section, of a printing system incorporating the subject matter of the present invention.

DESCRIPTION OF THE PREFERRED EMBODIMENT

As seen in the single FIGURE of the drawing, an ink reservoir 10 contains a supply of printing ink 12 which is sufficient for printing twenty million characters. A length of tubing 14 is connected at one end to an outlet portion 16 of the reservoir 10 and at the other end to an ink jet print head 18 of the transducer type. The print head 18 includes a body portion 20 of cylindrical form having a passageway 22 therethrough and terminating in a nozzle 24 for ejecting a droplet 26 of printing ink to be applied to record media 28, which media may be in the form of paper on a drum or platen.

The print head 18 may include a piezoelectric device or tubular type transducer 30, as disclosed in Zoltan U.S. Pat. No. 3,683,212, for causing ejection of ink droplets 26 either in synchronous or asynchronous manner from the nozzle 24. The ink droplets 26, so produced, are essentially the same or constant in size until a point in time when the ink supply is exhausted or depleted and at which time no further ink droplets are ejected. At this point in time, the impending exhausted ink supply is therefore not readily detected or sensed from an observation of the record media. A solution to the problem of the non-detection of a low ink supply is one of sensing the ink level in the reservoir. As represented by means disclosed in the above-mentioned patents, the low ink supply detection may be accomplished by electro-optical sensors or conductivity sensors to activate a warning signal signifying the need for replenishing the printing ink. Additionally, a floating object in the reservoir of a particular printing system could be used to trip an electrical switch or like mechanism to provide indication of a low ink supply.

The present invention provides an indication of the low ink supply without requiring the use of electrical sensors or like mechanisms. The low ink supply indication is accomplished by providing a small volume of indicating fluid 32 which fluid has a lower density than the printing ink 12 and has the characteristic of being immiscible with the ink. The indicating fluid 32 contains a soluble dye to provide a different color printing than the ink 12 and is formulated to operate efficiently in the ink jet print head 18 and also to be easily purged therefrom.

The indicating fluid 32 is provided in sufficient quantity to form a floating layer on the printing ink 12 in the reservoir 10 and as the ink in the reservoir is depleted, the indicating fluid flows into the tubing 14 and displaces all the ink in the print head 18. When the printing ink 12 is depleted, the fluid 32 is caused to be ejected from the nozzle 24 in printing operation and the droplets of the fluid form printing of a different color on the record media 28 to establish an indication of a low ink supply.

The volume of indicator fluid 32 to be provided in the reservoir 10 can be selected in an amount to fill the interior of the tubing 14 and of the print head 18. In this manner, it is seen that when the reservoir 10 is refilled with printing ink 12 all previous indicating fluid 32 can be purged from the system and the refilled reservoir would contain a new supply of indicator fluid. In the case of a disposable-type reservoir, a larger supply of indicating fluid 32 can be used without the problem of accumulating too much fluid.

A representative application of the supply of printing ink would provide sufficient ink for printing twenty million characters with about one percent of the volume of the ink comprising the low ink indicating fluid 32. A typical value for the volume of printing ink 12 in the reservoir 10 may be 100 cubic centimeters with ½ cubic centimeter of indicating fluid 32 on the surface of the ink 12. Of course, it is readily seen that the single drawing FIGURE shows these values in a non-proportional manner. While the transition from the printing ink color to the indicating fluid color may be discernible and readily seen within a few characters, it is possible to print with the indicating fluid for hundreds or even thousands of characters.

While there are many different ink jet printer configurations, the indicating fluid concept is seen as being applicable for and compatible with printers of the tubular transducer type mentioned above, printers which include a nozzle plate incorporating one or more orifices for ejecting droplets of ink, or printers of the rotary type which may include a rotating reservoir for containing a supply of printing ink.

Additionally, the indicating fluid is disclosed herein as being of a type known as oleic linoleic acid oil (cottonseed oil) and produced or manufactured by Buckeye Oil Company, Corinth, Mississippi. Such indicating fluid 32 has a reasonably high surface tension (35 dynes per centimeter) and a moderately low viscosity, (50 centipoises) which figures approximate the properties of the printing ink (41 dynes per centimeter and 35 centipoises). A high surface tension is required for quickly refilling, for proper droplet formation and to resist air ingestion into the ink 12, whereas low viscosity is required for adequate ink flow and droplet speed. The indicator fluid 32 should have a viscosity and a surface tension approximating these figures for the printing ink 12 in order to provide for proper operation of the print head 18. It should also be noted that an alternate indicating fluid is lauric acid oil (coconut oil) which has a surface tension of 30 dynes per centimeter and a viscosity of 33 centipoises.

It is thus seen that herein shown and described is a low ink indicating means which provides visual observation of depletion of the printing ink. The apparatus and material of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof are to be construed in accordance with the following claims.

I claim:

1. Means for indicating low ink supply comprising:
   means containing a supply of ink,
   means operably associated with said ink supply means for ejecting ink in droplet form onto record media, and a
   liquid placed on the surface of said supply of ink and different in color therefrom and visually observed on said record media when said ink supply is exhausted.

2. The subject matter of claim 1 wherein the liquid is of lower density than the ink.

3. The subject matter of claim 1 wherein the liquid is immiscible with respect to the ink.

4. The subject matter of claim 1 wherein the containing means is a reservoir having a supply of ink therein and the liquid floats on the surface of the ink.

5. The subject matter of claim 1 wherein the means for ejecting droplets of ink is a piezoelectric transducer.

6. The subject matter of claim 1 wherein the liquid is an oleic acid oil.

7. The subject matter of claim 1 wherein the liquid is a lauric acid oil.

8. In an ink jet printer,
   means containing a supply of ink, means operably associated with said ink supply means for ejecting droplets of ink onto record media, and means for indicating an exhausted supply of ink upon visually observing a change in color of droplets of liquid on said record media.

9. In the printer of claim 8 wherein said indicating means comprises a liquid on the surface of said ink and is conveyed through said ejecting means upon exhaustion of said supply of ink.

10. In the printer of claim 9 wherein said liquid is of lower density than the ink.

11. In the printer of claim 9 wherein the liquid is immiscible with respect to the ink.

12. In the printer of claim 9 wherein said liquid contains a soluble dye of different color from the ink.

13. In the printer of claim 9 wherein said containing means is a reservoir and the liquid floats on the surface of the ink.

14. In the printer of claim 9 wherein the droplet ejecting means comprises a piezoelectric transducer.

15. In the printer of claim 9 wherein the liquid is an oleic acid oil.

16. In the printer of claim 9 wherein the liquid is a lauric acid oil.

* * * * *